May 7, 1963  J. M. GUENTHER  3,088,114
BOX MAKING MACHINE
Filed Nov. 20, 1961  4 Sheets-Sheet 1
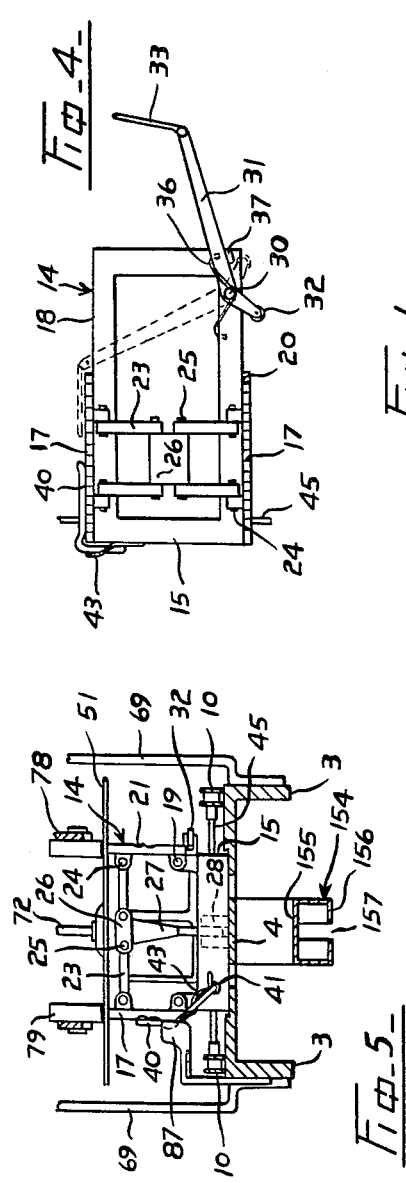
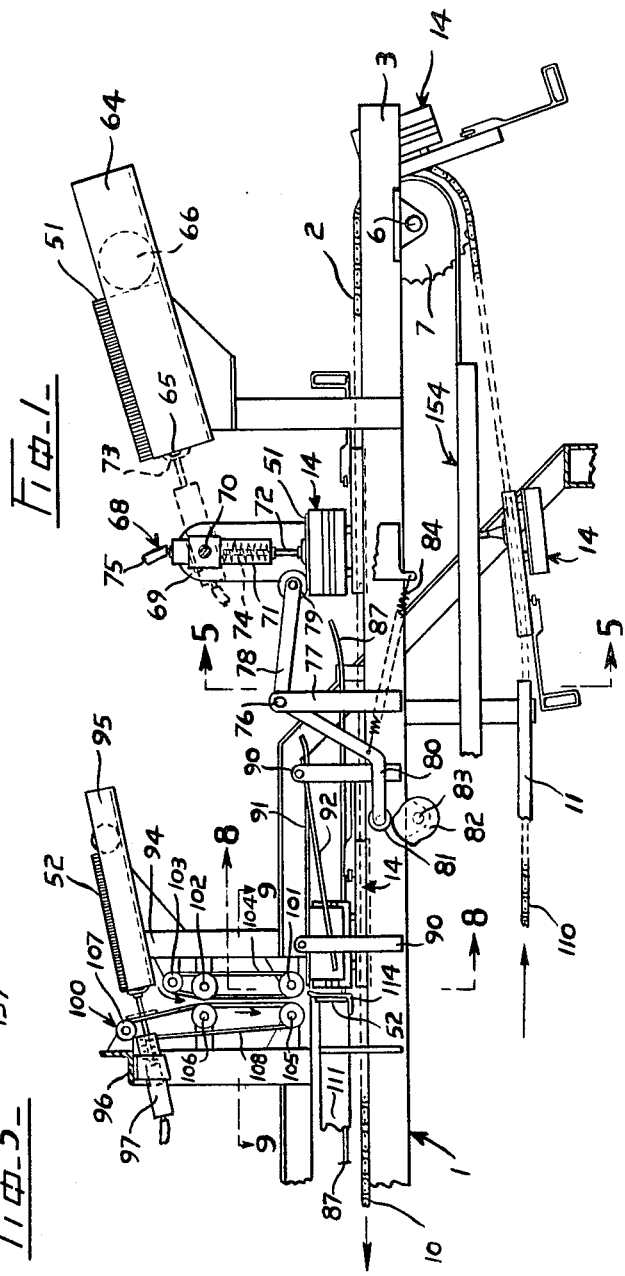
INVENTOR
JOHN M. GUENTHER
By Hugo Ray
Agent

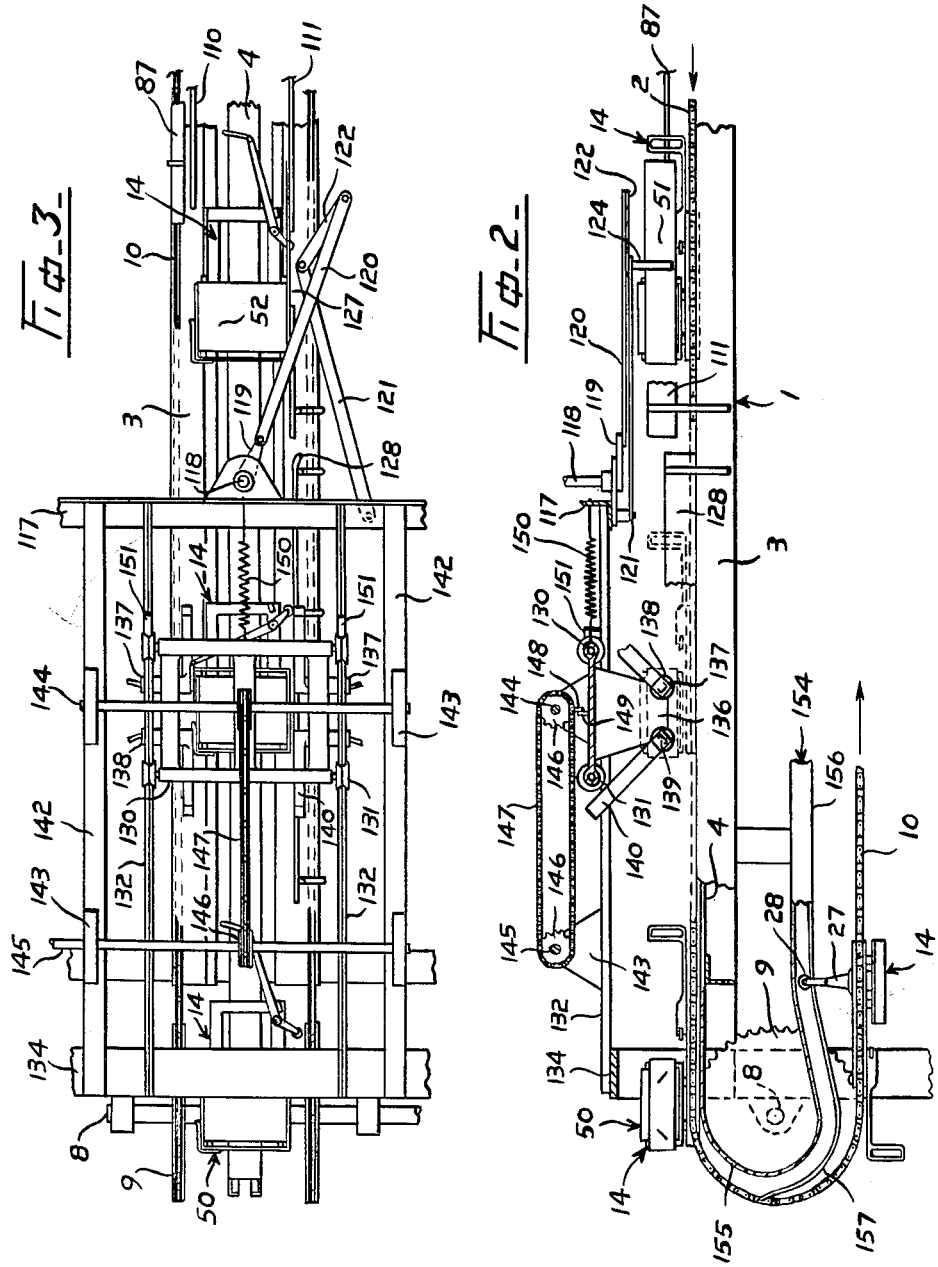

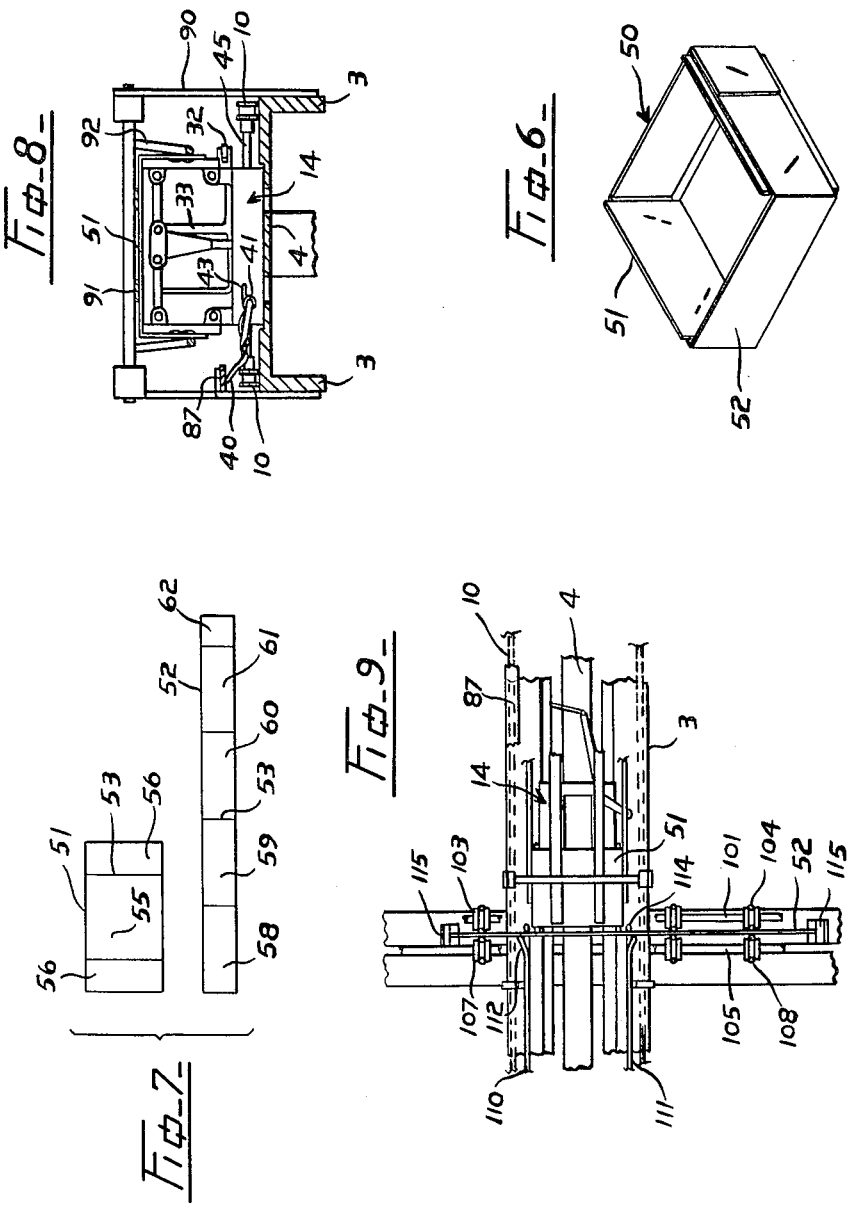

May 7, 1963 J. M. GUENTHER 3,088,114
BOX MAKING MACHINE
Filed Nov. 20, 1961 4 Sheets-Sheet 4
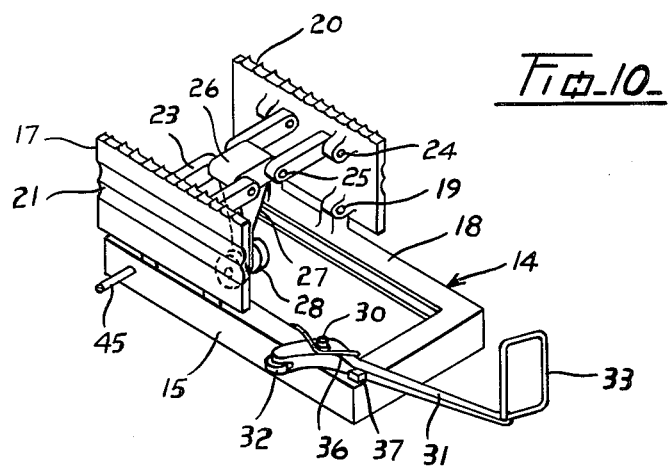
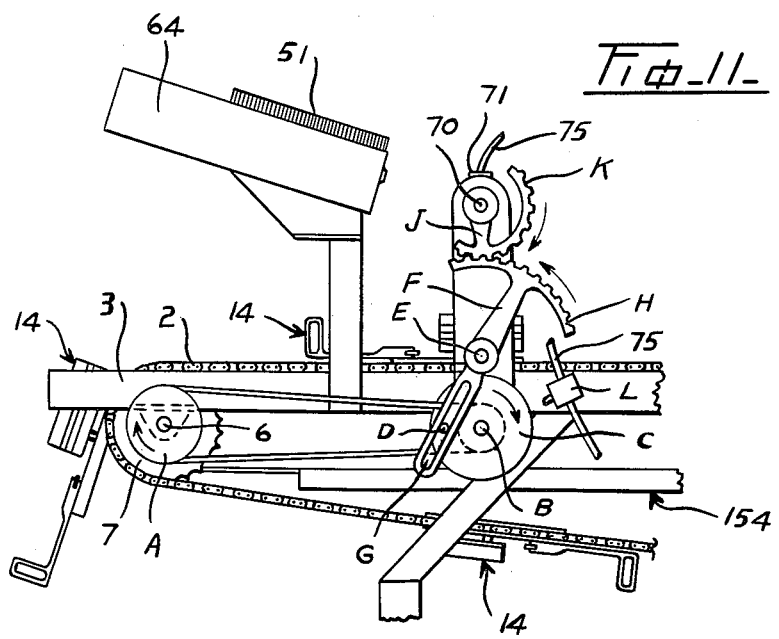
INVENTOR
JOHN M. GUENTHER
BY Ernest E Carver
Agent United States Patent Office 3,088,114
Patented May 7, 1963

3,088,114
BOX MAKING MACHINE
John M. Guenther, 41906 Central Road, Yarrow,
British Columbia, Canada
Filed Nov. 20, 1961, Ser. No. 153,397
10 Claims. (Cl. 1—111)

This invention particularly relates to a machine for mass producing berry boxes of the type used as a container for strawberries and the like.

The objects of the invention are to provide a machine in which the box parts may be formed and fastened together as a continuous high speed operation and to ensure that the containers are of a uniform high standard which will obviate the need for subsequent hand labor or inspection.

A further and important object of the invention is to provide a box-like form around which the container may be fashioned and to provide means for collapsing the form to ensure that the completed box is discharged from the machine.

FIGURE 1 is a fragmentary longitudinal view part in section, of the right end of the machine.

FIGURE 2 is a similar view of the left end and is a continuation of FIGURE 1.

FIGURE 3 is a plan of the structure of FIGURE 2.

FIGURE 4 is a plan of the box form on an enlarged scale.

FIGURE 5 is an enlarged vertical section taken on the line 5—5 of FIGURE 1.

FIGURE 6 is a perspective view of a berry box made by the machine.

FIGURE 7 is a plan of the box slats.

FIGURE 8 is a vertical section taken on the line 8—8 of FIGURE 1.

FIGURE 9 is a sectional plan taken on the line 9—9 of FIGURE 1.

FIGURE 10 is a perspective view of the box form.

FIGURE 11 is an elevation of the opposite side of the end of the machine shown in FIGURE 1.

In the drawings like characters of reference indicate corresponding parts in each figure.

The numeral 1 indicated generally a frame which serves to support a horizontal conveyor 2. The conveyor has a bed formed of transversely spaced members 3 and a central track 4. At the right end of the conveyor bed, the members 3 are connected by a rotatably mounted shaft 6 which is fitted with a pair of small sprockets 7. A shaft 8 carrying large sprockets 9 is similarly mounted at the left end of the bed. Endless chains 10 are trained over the sprockets so that their upper runs are supported by the members 3 and preferably the lower runs of the chains are carried in channel lengths 11 which are suspended below the bed.

An electric motor is mounted beneath the frame 1 and a suitable drive train couples the motor to the shaft 8 whereby the chains 10 may be driven in the direction of the arrows of FIGURES 1 and 2. The drive train includes the various power take-off drives required to operate the several box-forming devices on the machine. Since such drives are well known and do not form essential parts of this invention they have not been illustrated in the drawing nor is detailed description deemed to be necessary.

The conveyor 2 is provided with a number of suitably spaced box forms 14 each consisting of a rectangular base frame 15 which may be formed of channel section. Rectangular side plates 17 are hingedly connected to the sides 18 of the base frame as at 19. The upper edge of the plates 17 have a number of short needle-like prongs 20 and the outer faces of said plates are provided with closely spaced arcuate grooves 21 which extend parallel to the pronged upper edge.

Inwardly extending arms 23 are hingedly connected as at 24 to each of the side plates and hinge pins 25 secure said arms to a centrally disposed block 26. The block is fitted on its underside with a vertical leg 27 and mounted on the lower end of said leg is a pair of rollers 28.

One of the sides 18 is provided with a vertical pivot pin 30 and mounted for horizontal swinging movement on said pin is a tail arm 31. The arm is offset adjacent to and is supported by the pivot pin so that its short end projects just beyond the adjoining side plate 17. A horizontal roller 32 is carried on this projecting and offset end of the arm. The other end of the arm 31 supports a vertically extending clamp 33 which is a rectangular frame disposed at an obtuse angle to its supporting arm. A spring 36 is mounted on the pivot pin 30 and engages the arm 31 and the side 18 whereby normally to hold said arm in engagement with a stop 37 carried by the frame 15.

The other or leading end of the frame is fitted with a clamping bar 40 which is rockingly mounted in a horizontal bearing 41 see particularly FIGURES 4, 5 and 8. The bar has an inclined portion 40A which extends parallel to the front of the box form and a rearwardly extending free end 40B which terminates near the centre of the adjoining side plate 17. The free end 40B of the bar 40 is normally held in contact with the side plate by means of a spring 43.

The box form is secured to the conveyor chains 10 by one or more transverse rods 45 which extend through the sides 18 so as to support the form in sliding engagement with the conveyor members 3. When so supported, the rollers 28 ride upon the track 4 and the leg 27 is held vertically and arms 23 are held horizontally to rigidly support the side plates 17 in vertical position.

The present machine is designed to mass produce an open-topped box 50 using rectangular slats 51 and 52. Preferably, the slats are of thin sheets of spruce and prior to being processed in the machine the slats are provided, on one side only, with very shallow score lines 53 to facilitate folding. The lines 53 divide the bottom slat 51 into a centre panel 55 and two end portions 56. On the side slat 52, the score lines define equal sized parts 58, 59, 60, 61 and a relatively small tab 62.

Supported on the right end of the conveyor 2 is a feed chute 64 in which the slats 51 are stored with their scored surfaces towards the delivery end of the chute. The delivery end may be provided with short fingers 65 to grip the end edges of the slats and a heavy roll 66 would serve to advance the material to the delivery end.

The bottom slats are removed from the chute 64 and placed on the forms 16 by means of a pick-up head 68 which consists of a pair of uprights 69 mounted on the conveyor bed to journal a horizontal shaft 70. An air cylinder 71 is carried by the shaft and its piston rod 72 is fitted with a suction cup 73. A spring 74 within the cylinder normally retains the rod 72 in retracted position and an air hose 75 connects said cylinder to a suitable source of air pressure, not shown. The shaft 70 is connected to the drive train of the machine in such a way that the air cylinder is rocked between the solid and dotted line positions in timed relation to the movement of the box forms. When in the above mentioned positions, the cylinder 71 is momentarily pressurized to alternatively thrust the cup 73 into engagement with a bottom slat and to place the slat upon a passing box form. A preferred method of rocking the shaft 70 in this manner is illustrated in FIGURE 11 only. A belt and pulley drive A connects the shaft 6 to a stub shaft B mounted on a member 3 of the frame. Fitted to the stub shaft is a disc C having an outwardly projecting pin D. Mounted on a pivot pin E carried by an upright 69 is an arm F which has a longitudinal slot G on its lower end and a toothed quadrant H on its upper end. The pin D slidably projects through the slot G. A crank J is fitted to the shaft 70 and this crank has a toothed quadrant K which engages the quadrant H. Each time the air cylinder 71 is rocked to the dotted line position of FIGURE 1 by the above described mechanism the arm F is swung into engagement with the operating plunger of an air valve L mounted on the frame 1. This valve is fitted to the air hose 75 connecting the cylinder 71 to its source of supply. Thus, the air cylinder is momentarily pressurized each time it is directed at the slats 51.

Near the pick-up head, a cross shaft 76 is carried by uprights 77 on the conveyor bed and fitted to said shaft are transversely spaced arms 78 which are fitted with presser rollers 79. A lever 80 secured to one end of the shaft 76 journals a roller 81 at its free end and this roller engages a cam 82 mounted on a driven shaft 83. A spring 84 connects the lever 80 to the conveyor bed and holds the roller in engagement with the cam.

As shown best in FIGURE 5 the pick-up head 68 places a slat 51 on the moving form 14 with the end portion 56 projecting beyond the side plates. At the moment of contact of the slat with the form, the cam 82 rocks the shaft 76 so that the presser rollers 79 are moved into engagement with the slats just beyond the leading edges thereof. The suction cup 73 may then be disengaged from the slat by the action of the spring 74 while the slat is pressed onto the prongs 20 by the rollers.

One of the conveyor members 3 is provided with a cam track 87 formed by a long strip of metal which, for the greater part of its length, extends parallel to the conveyor bed. The track 87 is disposed in the path of the clamping bar 40 so that as the form moves away from the pick-up head, the bar engages the upwardly inclined end of the cam track and is swung downwardly thereby to be clear of the side plate 17 viz. the bar is moved from the position of FIGURE 5 to that of FIGURE 8.

The conveyor bed is bridged by a pair of inverted U-shaped supports 90 and extending between said supports are horizontal guide strips 91. Also carried by the supports 90 are inclined and converging rods 92. As the form 14 with a slat 51 thereon moves beneath the first support 90, the guide strips 91 slidably engage the top surface of the slat in the vicinity of the side plates to hold them against dislodgement from the form. Continued movement of the form towards the second support results in the then horizontally extending end portions engaging the rods 92 and being folded down at right angles to the panel 55 and into firm contact with the side plates 17.

Mounted on uprights 94 carried by the frame is a chute 95 which is substantially similar to the chute 64. A supply of slats 52 are stored in the chute 95, again with their scored surfaces facing towards the delivery end of said chute. A yoke 96 carried by the conveyor frame supports a second air cylinder 97 constructed as the previously described cylinder but in this case being stationary and aligned with its feed chute. Between the chute 95 and the cylinder 97 is a slat carrier 100 consisting of a driven shaft 101 and idler shafts 102 which are horizontally mounted on the uprights 94. The several shafts carry transversely spaced pulleys 103 over which belts 104 are trained. The yoke 96 also supports a driven shaft 105 and idler shaft 106 which have pulleys 107 and belts 108 and in this case the uppermost idler shaft is disposed above the axis of the cylinder 97. The shafts 101 and 105 are connected to the drive train so that the opposing runs of the several belts are driven in the direction of the arrows of FIGURE 1.

Beneath the carrier 100, the conveyor members 3 are fitted with fences 110 and 111, see particularly FIGURE 9, which fences are spaced apart a distance slightly greater than the width of the forms 14. Each fence has an outwardly turned end 112 and an L-shaped rod 114, the vertical leg of which is spaced from and extends parallel to said end.

Suitable means are provided whereby the cylinder 97 is automatically pressurized at intervals and the timing of this is such that, as the form 14 carrying a folded slab 51 approaches the chute 95, a slat 52 is extracted from said chute and is moved into contact with the belts 108. These belts serve to remove the extracted slat from the cylinder's suction cup whereupon the carrier 100 moves the slat down so that it is supported between the fence ends 112 and the rods 114 and in the path of the advancing form. As shown in FIGURE 9, the slat ends engage guide strips 115 whereby the slat is suitable positioned with respect to the form. The form then moves between the fences, the part 59 is engaged by the leading end of the form and the parts 58 and 60 are folded into contact with the portions 56 with the part 61 and tab 62 extending to the rear in alignment with the part 60.

The fence 110 is a relatively short one and the cam track 87 terminates just beyond the end of this fence. Thus, as the form is about to disengage the fence the clamping bar 40 passes the end of the track 87 and is snapped up by its spring 43 into engagement with the part 58. In this manner, the part 58 and the underlying end portion 56 are held against movement relative to the form during the formation of the remainder of the berry box.

Extending across the frame 1 above the conveyor is a member 117 in which a centrally disposed driven shaft 118 is journalled. A horizontal crank 119 is fitted to the shaft 118 and said crank is pivotally connected to an arm 120. To one side of the shaft 118, the member 117 also supports a swingingly mounted arm 121 and the outer end of this arm is pivotally connected to the adjoining end of the arm 120 by a relatively short arm 122. The connected ends of the arms 120 and 122 carry a downwardly projecting rod 124 which is shown on FIGURE 2. A gap 127 is provided in the fence 111 and the shaft 118 is rotated in a counterclockwise direction as viewed in FIGURE 3 so as to swing the rod 124 through said gap and towards a passing form 16. By virtue of the varying lengths of the several arms and the relative positions of their points of pivot, the rod 124 will be moved away from the centre of the conveyor at substantially twice the speed as it is moved in the opposite direction, thus ensuring that no obstrucion remains in the paths of travel of the box forms. Near the end of the fence 111 the conveyor member 3 is fitted with a cam track 128 which is disposed in the path of the roller 32 carried by the arm 31.

As the form moves beyond the gap 127 the rod 124 is swung through an arcuate path into engagement with the part 61. The movement of the rod is such as to fold the part 61 at right angles to the part 60 so that the tab 62 projects beyond the side of the form. Immediately after this folding action takes place the roller 32 contacts the cam track 128 and the arm 31 is caused to rock about its pivot so that the clamp 33 folds the tab 62 into overlapping engagement with the end of the part 58.

The form continues along the machine with the slats 51 and 52 folded in the above described manner and supported against displacement by the clamping bar 40 and the clamp 33. In this folded and clamped condition the box is advanced to a suitable stapling device which may consist of a carriage 130 having wheels 131 which ride upon tracks 132, the tracks extending between the member 117 and a frame member 134. Depending from the carriage on each side of the conveyor bed is a flange 136 which supports a pair of staplers 137. Each stapler consists of an air cylinder 138 which has its piston operatively connected to the staple driving plunger 139. The plunger extends through the staple holder 140 which I prefer to mount at 45° to the vertical.

The frame members 117 and 134 are bridged by longitudinal members 142 which support bearings 143 and journalled in said bearings is an idler shaft 144 and a drive shaft 145. Centrally disposed sprockets 146 are fitted to those two shafts and a chain 147 is trained over the sprockets. The chain 147 carries a radially extending pin 148 which is adapted to engage a lug 149 mounted on the top of the carriage 130. One or more springs 150 connects the carriage to the frame member 117 and stops 151 are provided on the tracks 132 to limit the endwise movement of the carriage towards said member.

The shaft 145 is driven by the drive train of the machine in timed relation to the movement of the conveyor so that, as a form carrying a completely folded box nears the stapler mechanism, the pin 148 engages the lug 149 to advance the carriage to the left along with the form. The form at this time is centered directly beneath the carriage and when air is automatically fed to the cylinders 138 the staplers are operated to fasten together the two slats. It will be noted that one staple is applied through the clamp 33 with all staples being disposed at an angle which prevents splitting of the slat material. It will also be noted that the grooves 21 on the side plates 17 coact with the plunger 139 to inwardly turn the end of the staples. When the lug 149 is disengaged by the pin 148 the carriage is returned by the spring 150 to abut the stops 151. The roller 32 then moves beyond the end of the cam track 128 and the arm 31 is returned by its spring to normal position.

In FIGURES 1, 2 and 5 it will be seen that the machine is provided with a cam track 154 which is suspended below the conveyor bed above the lower rims of the chains 10. The track 154 is a tubular member having a top wall 155 which is contiguous with the track 4 and a bottom wall 156 which has a longitudinal slot 157.

As the form 14 moves around the sprockets 9 its leg 27 enters the slot 157 and the rollers 28 engage the bottom wall 156. Since the spacing between the track 154 and the chain 10 gradually increases around the lower halves of the sprockets, the leg 27 is moved relative to the form and the side plates are swung about their hinges to collapsed position. This movement withdraws the prongs 20 from the wood and releases the box from form whereupon it is free to drop by gravity into a conveyor or storage bin.

At the right end of the machine the cam track 154 and chain 10 converge and in the vicinity of the shaft 6 the wall 155 again merges with the track 4. Thus, as the forms swing around the sprockets 7 the side plates are once more rigidly supported in the vertical position ready to receive another bottom slat in a repeat of the box forming operation.

What I claim is:

1. In a box making machine having a conveyor and a bed therefor, a box form comprising a base frame secured to the conveyor for sliding movement along the bed, opposing plates hingedly mounted on the base frame, a member hingedly connected to the plates, said member having engagement with a bed part to support the plates in extended position.

2. In a box making machine having a conveyor, a bed for the conveyor and a cam track on the bed, a box form comprising a base frame, plates hingedly mounted on the base frame, a member hingedly connected to the plates, said member having engagement with a bed part to support the plates in extended position, a tail arm pivotally mounted on the base frame at a point intermediate the length of the arm, one end of the tail arm having a plate engaging clamp and the other end of said tail arm being adapted to engage the cam track.

3. In a box making machine having a conveyor, a bed for the conveyor and a pair of cam tracks on the bed, a box form comprising a base frame, plates hingedly mounted on the base frame, a member hingedly connected to the plates, said member having engagement with a bed part to support the plates in extended position, a tail arm pivotally mounted on the base frame, at a point intermediate the length of the arm, one end of the tail arm having a plate engaging clamp, the other end of the tail arm having a member adapted to engage one of the cam tracks, a spring pressed clamping bar rockingly mounted on the base frame and normally engaging a plate, said clamping bar being adapted to engage the other of the cam tracks.

4. A box making machine having a conveyor and a bed therefor, a box form secured to the conveyor for endwise movement along the bed, said box form having a base frame, opposing side plates hingedly mounted on the base frame, a member hingedly connected to the side plates, said member having engagement with a bed part to support the side plates in extended position and means for swinging the side plates to collapsed position as the member disengages the bed part.

5. Structure as claimed in claim 4, and a tail arm pivotally mounted on the base frame, a clamp on one end of the tail arm and means for swinging the tail arm to move the clamp into contact with a side plate.

6. Structure as claimed in claim 4, and a clamping bar rockingly mounted on the box form, resilient means normally urging the clamping bar towards a side plate and means for swinging the clamping bar away from the side plate during part of the movement of the box form along the bed.

7. A machine adapted to make a box from a bottom slat and a side slat and comprising a conveyor having a bed, a box form secured to the conveyor for continuous endwise movement along the bed, said form having a base frame, opposing said plates hingedly mounted on the base frame, a vertical member hingedly connected at its upper end to the side plates, said member engaging a bed part to support the side plates in vertical position, means for placing a bottom slat on the side plates with its end portions projecting laterally therebeyond, means for folding the end portions into contact with the side plates, means for placing a side slat in the path of the advancing form, means for folding parts of the side slat into contact with the end portions and means for folding a part of the side slat to extend between the end portions.

8. Structure as claimed in claim 7, and means for folding an end of the side slat to overlap a side slat part and a bottom slat portion.

9. Structure as claimed in claim 7, and means for applying fasteners to secure the side slat to the bottom slat.

10. Structure as claimed in claim 7, and means for collapsing the side plates to dislodge the completed box from the box form.

References Cited in the file of this patent

UNITED STATES PATENTS

| | | |
|---|---|---|
| 1,122,814 | Stevenson | Dec. 29, 1914 |
| 2,548,231 | Walker | Aug. 4, 1925 |